(12) United States Patent
Ayyagari et al.

(10) Patent No.: US 11,803,776 B2
(45) Date of Patent: *Oct. 31, 2023

(54) COGNITIVE-BASED PASSENGER SELECTION

(71) Applicant: International Business Machines Corporation, Armonk, NY (US)

(72) Inventors: Phani Kumar V. U. Ayyagari, Hyderabad (IN); Manish A. Bhide, Hyderabad (IN); Madan K. Chukka, Hyderabad (IN); Purna Chandra Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,464

(22) Filed: Jun. 23, 2022

(65) Prior Publication Data

US 2022/0318680 A1 Oct. 6, 2022

Related U.S. Application Data

(63) Continuation of application No. 16/398,360, filed on Apr. 30, 2019, now Pat. No. 11,410,079, which is a (Continued)

(51) Int. Cl.
*G06N 20/00* (2019.01)
*G06Q 10/02* (2012.01)

(52) U.S. Cl.
CPC .......... *G06N 20/00* (2019.01); *G06Q 10/02* (2013.01)

(58) Field of Classification Search
None
See application file for complete search history.

(56) References Cited

U.S. PATENT DOCUMENTS 9,633,402 B1 * 4/2017 McCartney ........ G06Q 30/0629
2004/0226996 A1 11/2004 Stefani
(Continued)

FOREIGN PATENT DOCUMENTS

CN 112734259 A 4/2021
EP 2698749 2/2014

OTHER PUBLICATIONS

Intelligent Seat Assignment System, IP.com Prior Art Database Technical Disclosure, IPCOM000246258D, Electronic Publication Date: May 20, 2016.*

(Continued)

*Primary Examiner* — David J Stoltenberg
(74) *Attorney, Agent, or Firm* — Patterson + Sheridan, LLP

(57) ABSTRACT

Aspects of the invention perform an operation comprising receiving a plurality of rules associated with a first seat in a mass-transit vehicle, determining a plurality of physical attributes for a first passenger, of a plurality of passengers, based on data describing the first passenger received from a plurality of data sources, determining a plurality of non-physical attributes for the first passenger based on the received data describing the first passenger, determining that at least one of the plurality of physical attributes and the plurality of non-physical attributes of the first passenger satisfy each rule in the set of rules associated with the first seat, computing, based on a machine learning (ML) model a score for the first passenger, determining that the score exceeds a threshold score associated with the first seat, and allocating the first passenger to the first seat in the mass-transit vehicle.

14 Claims, 7 Drawing Sheets

Related U.S. Application Data continuation of application No. 15/791,961, filed on Oct. 24, 2017, now abandoned.

(56) References Cited

U.S. PATENT DOCUMENTS

| | | | |
|---|---|---|---|
| 2006/0229920 A1* | 10/2006 | Favorel | G06Q 10/02 705/5 |
| 2009/0063204 A1 | 3/2009 | Stirlen et al. | |
| 2011/0010135 A1 | 1/2011 | Boin | |
| 2011/0087506 A1 | 4/2011 | Barillec et al. | |
| 2012/0010912 A1 | 1/2012 | Lele et al. | |
| 2012/0022901 A1* | 1/2012 | Nasr | G06Q 10/02 705/5 |
| 2012/0123812 A1* | 5/2012 | Hornbaker | G06Q 10/02 705/5 |
| 2013/0054279 A1* | 2/2013 | Sharp | G06Q 10/06 705/5 |
| 2013/0054375 A1* | 2/2013 | Sy | G06Q 50/14 705/14.66 |
| 2013/0060585 A1 | 3/2013 | Hornbaker et al. | |
| 2013/0080357 A1* | 3/2013 | Boren | B64D 11/0696 244/118.6 |
| 2013/0262159 A1 | 10/2013 | Montero et al. | |
| 2014/0052482 A1* | 2/2014 | Le Marier | G06Q 10/02 705/5 |
| 2014/0114705 A1 | 4/2014 | Bashvitz et al. | |
| 2014/0244320 A1* | 8/2014 | Matsui | G06Q 10/02 705/5 |
| 2014/0309806 A1 | 10/2014 | Ricci | |
| 2015/0012467 A1 | 1/2015 | Greystoke et al. | |
| 2015/0242765 A1 | 8/2015 | Muirhead | |
| 2016/0358272 A1* | 12/2016 | Howe | G06Q 10/02 |
| 2017/0097243 A1 | 4/2017 | Ricci | |
| 2017/0200355 A1 | 7/2017 | Gruenbaum et al. | |
| 2017/0243172 A1 | 8/2017 | Dayama et al. | |
| 2017/0282821 A1 | 10/2017 | Zych | |
| 2017/0372236 A1* | 12/2017 | Iwanami | G06Q 10/02 |
| 2018/0018593 A1 | 1/2018 | Benavides et al. | |
| 2018/0039917 A1 | 2/2018 | Buttolo et al. | |
| 2018/0196433 A1 | 7/2018 | Rander | |
| 2018/0218470 A1 | 8/2018 | Belwafa et al. | |
| 2018/0276573 A1 | 9/2018 | Otillar et al. | |
| 2019/0122143 A1 | 4/2019 | Ayyagari et al. | |
| 2019/0258956 A1 | 8/2019 | Ayyagari et al. | |
| 2020/0370986 A1 | 11/2020 | Fuscone et al. | |

OTHER PUBLICATIONS

IBM, "List of IBM Patents or Patent Applications Treated as Related," for U.S. Appl. No. 17/808,464, "Cognitive Based Passanger Selection,", filed Jun. 23, 2022.

U.S. Appl. No. 15/791,961, "Cognitive-Based Passenger Selection," filed Oct. 24, 2017.

IBM, "List of IBM Patents or Patent Applications Treated As Related," for U.S. Appl. No. 15/791,961, "Cognitive Based Passenger Selection,", filed Oct. 24, 2017.

IBM, "List of IBM Patents or Patent Applications Treated As Related," for U.S. Appl. No. 16/398,360, "Cognitive Based Passenger Selection,", filed Apr. 30, 2019.

Towards an Intelligent Information System of Public Transportation, Mnasser et al., 978-1-4799-0313-9/13/$31.00 © 2013 IEEE.

Sebastian Raschka, Predictive modeling, supervised machine learning, and pattern classification, Aug. 25, 2014, Sebastian Raschka (Year: 2014).

Keith Kravitz, Grand Canyon Helicopter Tour Reviews—Weight Limit Fees and Window Seats, Feb. 11, 2016, Grand Canyon Helicopter Tour Reviews, printed through www.archive.org—date is in the URL in YYYYMMDD format (Year: 2016).

Adaptive Framework and User Preference Modeling for Economy Class Aircraft Passenger Seat, Tan et al., 2009 Third UKSim European Symposium on Computer Modeling and Simulation.

* cited by examiner

200

SERVICE RESULTS FOR PERSON A:
- PHYSICALLY FIT
- AUTHORS AN ADVENTURE SPORTS BLOG
- EXCITED ABOUT TRAVEL
- SCORE: 99

220

SERVICE RESULTS FOR PERSON B:
- WEARING LEG CAST
- NOT PHYSICALLY FIT
- ENJOYS FLYING
- WILLING TO HELP OTHERS
- SCORE: 25

221

SERVICE RESULTS FOR PERSON C:
- PHYSICALLY FIT
- SCARED OF HEIGHTS
- NEVER FLOWN BEFORE
- NERVOUS
- SCORE: 65

222

SERVICE RESULTS FOR PERSON D:
- PHYSICALLY FIT
- ATHLETE
- RELAXED
- ENJOYS FLYING
- SCORE: 95

223

201

| 202 | 203 | 204 | 205 |
| 206 | 207 | 208 | 209 |
| 210 | 211 | 212 | 213 |

| PERSON | A | B | C | D |
|---|---|---|---|---|
| SEAL | 206 | 211 | 204 | 209 |

COGNITIVE-BASED PASSENGER SELECTION

CROSS-REFERENCE TO RELATED APPLICATIONS

This application is a continuation of co-pending U.S. patent application Ser. No. 16/398,360, filed Apr. 30, 2019, which is a continuation of co-pending U.S. patent application Ser. No. 15/791,961, filed Oct. 24, 2017. The aforementioned related patent applications are herein incorporated by reference in their entirety.

BACKGROUND

The present invention relates to computer software, and more specifically, to computer software which provides cognitive-based passenger selection for vehicles.

Mass transit operators are constantly trying to improve safety measures and precautions used to ensure the safety of all people on board. However, limited attention has been given to programmatically allocating passengers to seats, especially seats that are associated with various restrictions, such as exit-row seats in an aircraft, train, or bus. Often, users select these seats because of the extra leg room provided. However, many users select these seats even if they are unwilling and/or unable to perform the duties associated with the seats. In some circumstances, mass transit employees may allocate passengers to seats before the vehicle departs. In such circumstances, the employees may not be able to determine whether a passenger is willing and/or able to perform the duties associated with the seats. As such, the safety of all persons on board may be at risk during an emergency situation.

SUMMARY

In one embodiment, a method comprises receiving a plurality of rules associated with a first seat in a mass-transit vehicle, determining a plurality of physical attributes for a first passenger, of a plurality of passengers, based on data describing the first passenger received from a plurality of data sources, determining a plurality of non-physical attributes for the first passenger based on the received data describing the first passenger, determining that at least one of the plurality of physical attributes and the plurality of non-physical attributes of the first passenger satisfy each rule in the set of rules associated with the first seat, computing, based on a machine learning (ML) model a score for the first passenger, determining that the score exceeds a threshold score associated with the first seat, and allocating the first passenger to the first seat in the mass-transit vehicle.

In one embodiment, a computer program product comprises a non-transitory computer-readable storage medium having computer readable program code embodied therewith, the computer readable program code executable by a processor to perform one or more methods described herein.

In one embodiment, a system comprises a processor and a memory storing one or more instructions which, when executed by the processor, performs one or more methods described herein.

BRIEF DESCRIPTION OF THE SEVERAL VIEWS OF THE DRAWINGS

FIG. 2 is a schematic illustrating an example cognitive-based selection of passengers, according to one embodiment.

DETAILED DESCRIPTION

Embodiments disclosed herein leverage cognitive computing to intelligently allocate passengers to seats in a vehicle in accordance with predefined rules associated with the seats. Generally, embodiments disclosed herein identify different physical and non-physical attributes of each passenger. The attributes may include, without limitation, behavioral, cognitive, mental, emotional, personal, and physical attributes. Embodiments disclosed herein leverage the identified attributes to generate an allocation of passengers to seats that ensures the rules associated with each seat are satisfied by each user allocated to the seat. For example, a person may be physically fit, but unable to act in stressful situations due to fear of heights. Therefore, embodiments disclosed herein would refrain from assigning the person to an exit row seat in an aircraft. Instead, embodiments disclosed herein would attempt to identify persons who are physically, mentally, and emotionally able to sit in the exit row seat in the aircraft.

Figure 1:
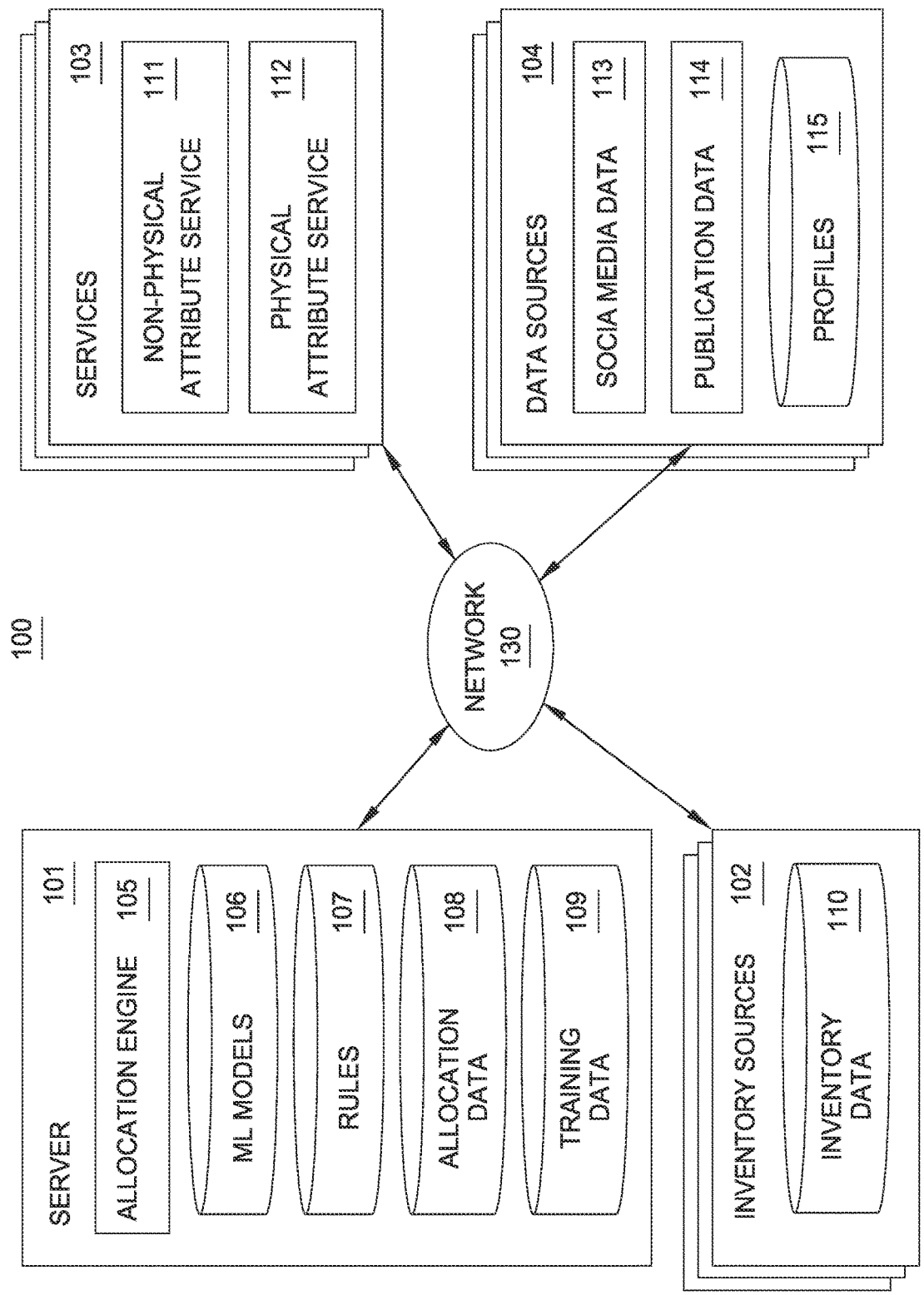
FIG. 1 illustrates an example system architecture which provides cognitive-based passenger selection for vehicles, according to one embodiment.

FIG. 1 illustrates an example system architecture 100 which provides cognitive-based passenger selection for vehicles, according to one embodiment. As shown, the system 100 includes a server 101, one or more inventory sources 102, a plurality of services 103, and a plurality of data sources 104 communicably coupled via a network 130. The server 101 includes an allocation engine 105, and data stores of machine learning (ML) models 106, rules 107, allocation data 108, and training data 109. The allocation engine 105 is configured to intelligently allocate passengers to seats in vehicles based on programmatically determined attributes of the passengers and one or more rules in the rules 107 applicable to each seat in a given vehicle. The passenger attributes include, without limitation, physical attributes and non-physical attributes, such as mental attributes, emotional attributes, personality traits, preferences, and the like. The vehicles include any type of passenger vehicle, such as airplanes, trains, and buses. Although airplanes, trains, and/or buses are used as reference examples herein, the techniques of the disclosure are applicable to any type of mass transit vehicle.

The rules 107 are representative of any type of rule, such as rules specifying required physical attributes of a passenger to sit in a given seat in a vehicle, such as minimum and/or maximum passenger height and/or weight, passenger ability to lift a minimum amount of weight, minimum muscle mass of a passenger, no current injuries, etc. The rules 107 further include rules specifying required mental attributes, emotional attributes, personality traits, and other non-physical attributes (e.g., age) required to sit in a given seat in a vehicle. For example, a rule in the rules 107 may specify that passengers with fear of heights cannot sit in an exit-row seat in an aircraft. As another example, a rule in the rules 107 may specify that passengers must be able to perform tasks in emergency situations. Generally, the rules 107 include rules defined by law, as well as rules defined by a system administrator (e.g., the operator of an airline, train, etc.) to enhance passenger safety.

The allocation engine 105 generates the ML models 106 during a training session based on the training data 109. The training data 109 includes labeled input that allows the allocation engine 105 to compute a desired outcome. For example, the training data 109 may include a set of input parameters related to different types of passenger attributes and rules 107 associated with a plurality of different types of seats in different types of vehicles. The training data 109 may further specify whether one or more passenger attributes would satisfy one or more rules 107 for a given seat in a given type of vehicle. Therefore, as part of the training session, the allocation engine 105 generates the ML models 106 that specify features and associated weights. The allocation engine 105 then uses the ML models 106 to allocate passengers to seats in vehicles. For example, during training, the allocation engine 105 may determine that a range of body mass index (BMI) values is correlated with passengers who satisfy the rules 107 for a seat in a vehicle. In such an example, the allocation engine 105 generates an ML model 106 which specifies a greater weight to passengers having a BMI in the determined range of BMI values. As another example, the allocation engine 105 may determine that passengers who engage in action sports (e.g., skydiving) are correlated with passengers who satisfy the rules 107 for a seat in a vehicle. In such an example, the allocation engine 105 generates an ML model 106 which specifies a greater weight to those passengers who engage in action sports. In both examples, doing so allows the allocation engine 105 to allocate passengers to seats in a manner which satisfies the rules 107 more to a degree that is greater than allocating passengers to seats without using the ML models 106.

Once trained, the allocation engine 105 may receive requests to allocate passengers to seats, and generate allocations which are stored in the allocation data 108. For example, the allocation engine 105 may receive a request from an airline, and receive inventory data 110 from the inventory source 102 for the airline. The inventory sources 102 are representative of mass transit data systems, such as airline data systems, train data systems, railroad data systems, etc. The inventory data 110 specifies passengers who have tickets for a given trip in a vehicle, the available seats in the vehicle, and one or more attributes for each seat in the vehicle. The attributes for the seat may include any associated rules for the seat as well as a priority for the seat. The seat priority may reflect a relative level of importance allocating passengers to the seats who meet predefined requirements in order to improve safety for the passengers in the vehicle. The inventory data 110 may further include user-specified data (e.g., information provided during the ticketing process), which may include any number and type of physical and non-physical attributes.

To generate the allocations of passengers to seats, the allocation engine 105 processes information regarding each passenger specified in the inventory data 110. More specifically, the allocation engine 105 receives data describing each passenger from one or more data sources 104. The data sources 104 are representative of any type of data source. As shown, the data sources 104 include, without limitation, social media data 113, publication data 114, and profiles 115. The social media data 113 is representative of data from user accounts on social media platforms, where users may specify attributes as biographical information, friendships, relationships, and the like. Similarly, the social media data 113 is representative of photos, videos, text, and other types of content posted by the user on the social media platforms. The publication data 114 is representative of blogs, articles, and any other type of information published by the users on the Internet. The profiles 115 are representative of any type of user profile which stores data describing user attributes.

For example, a user may maintain a travel blog. The allocation engine 105 may receive the publication data 114 from the user's travel blog, and perform natural language processing on the text of the blog to extract different attributes of the user therefrom. For example, the allocation engine 105 may determine that the user enjoys to travel, and frequently engages in surfing and skiing. Similarly, the allocation engine 105 may determine that the user is in several groups related to travel and action sports on one or more social media platforms.

The allocation engine 105 further leverages the services 103, which are representative of any type of online service. As shown, the services 103 include, without limitation, the non-physical attribute service 111 and the physical attribute service 112. The non-physical attribute service 111 is generally configured to discover information describing non-physical attributes of a person. The non-physical attributes include, without limitation, how the person acts, how the person thinks, emotions expressed by the person, mental health, preferences, likes, dislikes, personality traits, and the like. One example of a non-physical attribute service 111 is "Watson Personality Insights" by IBM Corporation of Armonk, N.Y. The physical attribute service 112 extracts physical attributes of a given person based on an analysis of one or more images of the person. For example, the physical attribute service 112 may apply image analysis algorithms to detect attributes of the person(s) depicted in an image. The image analysis algorithms may include computer vision algorithms (e.g., to detect objects, features, or other physical attributes), facial recognition algorithms, and other image analysis routines. Doing so allows the physical attribute service 112 to determine an approximate, height, weight, BMI, amount of muscle mass, etc. of a person. Similarly, the physical attribute service 112 may identify whether the person is depicted in images engaging in sports or other activities. Furthermore, the physical attribute service 112 may identify whether the person has limitations (e.g., is wearing a cast to heal a broken bone). One example of a physical attribute service 112 is "Watson Visual Recognition" by IBM.

Therefore, for each passenger, the allocation engine 105 may make an application programming interface (API) call to the non-physical attribute service 111, which specifies to extract non-physical attributes of the passenger (e.g., based on the data from the data sources 104). Similarly, the allocation engine 105 makes an API call to the physical attribute service 112 specifying to extract physical attributes of each passenger based on the data from the data sources 104. The allocation engine 105 uses the results provided by the non-physical attribute service 111 and the physical attribute service 112 to allocate passengers to seats. For example, if the physical attribute service 112 identifies an image of an example passenger in which the passenger is wearing a cast on their arm, the allocation engine 105 may compute a score for the passenger (based on the ML models 106) which indicates the user should not be seated in an exit row seat of an aircraft. As another example, if the non-physical attribute service 111 returns an indication that a passenger enjoys to travel and is engaged in action sports, the allocation engine 105 may compute a score which indicates the user is able to sit in an exit row seat of an aircraft.

More generally, if at any point the allocation engine 105 determines that an attribute of the person violates a rule in the rules 107 for a given seat, the allocation engine 105 refrains from allocating that person to the seat. For example, if a profile 115 specifies that the person's age is outside of a range of ages specified in the rules 107 for sitting in a given seat, the allocation engine 105 refrains from allocating the person to the seat. Similarly, if a person has a broken bone, a rule in the rules 107 may be violated for an exit row seat, and the allocation engine 105 would refrain from allocating the person to an exit row seat.

The allocation engine 105 may be invoked at any time to refine the seat allocations in the allocation data 108. For example, the allocation engine 105 may initially allocate a person Y to an exit row seat. However, before the flight departs, the allocation engine 105 may reprocess the data of person Y, and determine that person Y published a blog post (after the allocation of person Y to the exit row seat) expressing a fear of flying. As such, the allocation engine 105 may remove person Y from the exit row seat, and select a more suitable person for the exit row seat.

FIG. 2 is a schematic 200 illustrating an example cognitive-based selection of passengers, according to one embodiment. As shown, FIG. 2 depicts an example vehicle 201 that includes example seats 202-213. Although the vehicle 201 is shown as including the seats 202-213, the vehicle 201 may generally include any number of seats. In the example depicted in FIG. 2, seats 206-209 may be "exit row" seats that include one or more rules defined in the rules 107. For example, the rules 107 may specify rules related to physical attributes such as height, weight, lifting ability, BMI, etc. The rules 107 may further specify rules related to non-physical attributes, such as not being scared of heights, willingness (or ability) to assist others, good mental health, emotions that cannot be expressed (e.g., fear, hostility, etc.), and emotions that must be expressed (e.g., confidence, assertiveness, etc.). The rules 107 may further specify minimum score thresholds for sitting in a given seat.

As shown, FIG. 2 further depicts example service results 220-223 returned by the services 111, 112 for four example persons. However, in some embodiments, the allocation engine 105 may make similar determinations based on the data received from the data sources 104 for a given person. Based on the service results 220-223, the allocation engine 105 computes one or more scores for the respective person using the weights defined in the ML models 106. For example, the allocation engine 105 has computed a score of 99 (on a scale of 0-100) for person A, based on the service results 220 specifying that person A is physically fit, authors an adventure sports blog, and is generally excited about travel. As another example, the allocation engine 105 has computed a score of 25 for person B based on the results 221, which specify that person B is currently wearing a cast on their leg (which may violate a rule in the rules 107), is not physically fit, but enjoys flying and is willing to help others.

Once the allocation engine 105 computes a score for each person, the allocation engine 105 generates a list that ranks each person based on the computed score, and allocates the people to the seats 202-213 based on the rankings. For example, as shown, FIG. 2 depicts an example table of allocation data 108, where the allocation engine 105 has allocated person A to seat 206, person B to seat 211, person C to seat 204, and person D to seat 209. Therefore, the allocation engine 105 allocates the people with the highest scores to the exit row seats 206, 209, while refraining from allocating people with lower scores to seats 207-208. The allocation engine 105 may refrain from allocating the people with lower scores to seats 207-208 based on a determination that one of the rules 107 has been violated and/or based on a determination that the scores computed for persons B, C in results 221, 222 fall below a threshold score for sitting in seats 206-209. Similarly, the seats 202-205 and 210-213 may have associated rules 107 and/or score thresholds. For example, seat 204 may have additional leg room, and a rule 107 specifies that seat 202 should be allocated to users needing the additional leg room. Therefore, the allocation engine 105 determines, based on person B wearing a cast on their leg, that person B satisfies this rule, and allocates person B to seat 204.

Figure 3:
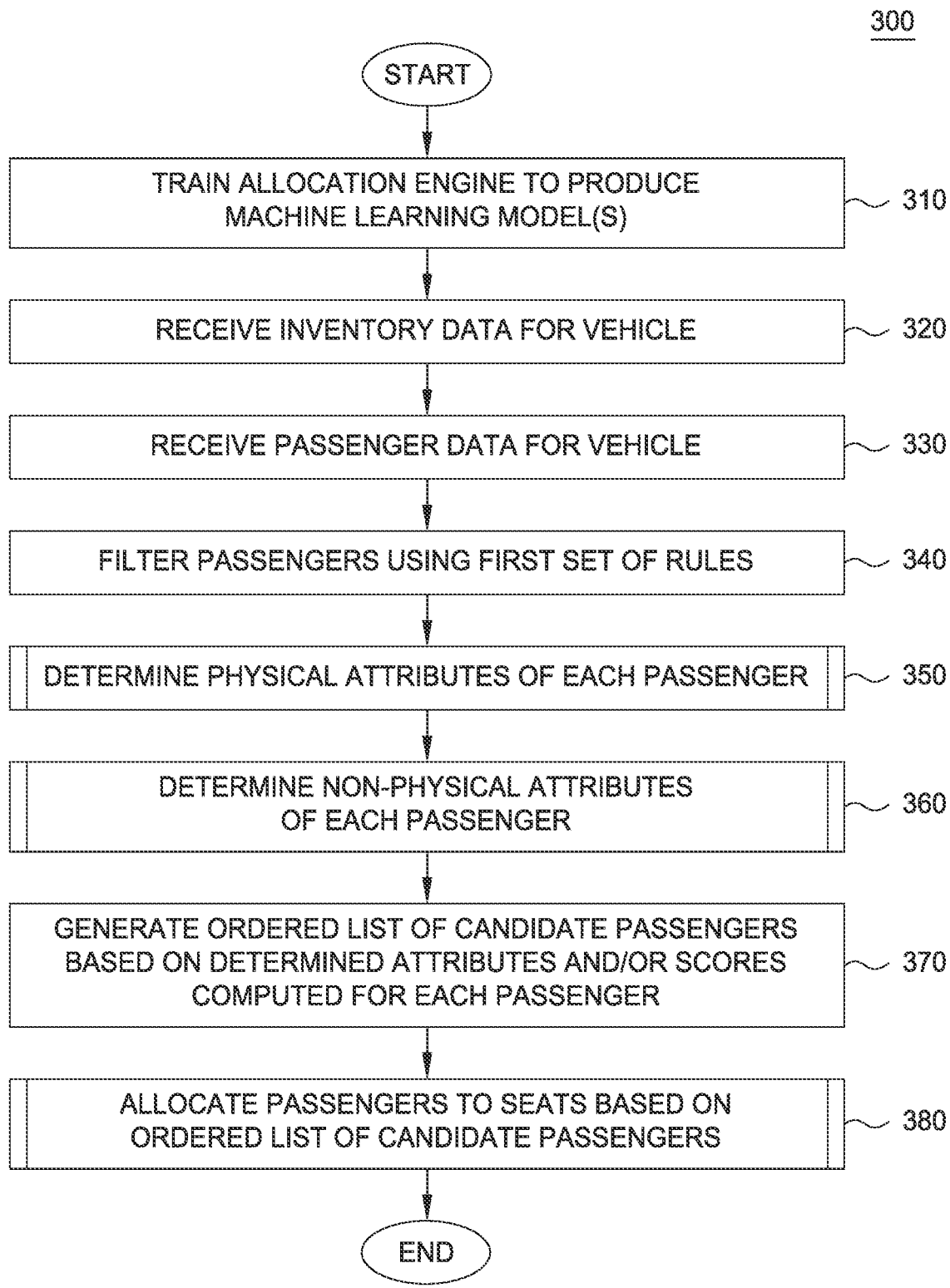
FIG. 3 is a flow chart illustrating an example method to provide cognitive-based passenger selection for vehicles, according to one embodiment.

FIG. 3 is a flow chart illustrating an example method 300 to provide cognitive-based passenger selection for vehicles, according to one embodiment. As shown, the method 300 begins at block 310, where the allocation engine 105 is trained to produce the ML models 106 as described above. At block 320, the allocation engine 105 receives inventory data 110 for a given vehicle as part of a request to generate an allocation of passengers to seats in the vehicle for a given trip (or plurality of trips) of the vehicle. At block 330, the allocation engine 105 receives the passenger data for the vehicle, which may be specified in the inventory data 110 received at block 320. Generally, the passenger data includes an indication of each passenger who currently holds a ticket to travel on the vehicle. At block 340, the allocation engine 105 filters the passengers using a first set of rules in the rules 107. For example, if a first passenger does not meet height requirements mandated by law for an exit row seat, the allocation engine 105 removes the first passenger from consideration for allocation to exit row seats.

At block 350, described in greater detail below with reference to FIG. 4, the allocation engine 105 determines the physical attributes of each remaining passenger that was not filtered at block 340. Generally, the allocation engine 105 leverages the data sources 104 and the physical attribute service 112 to determine the physical attributes of a given passenger. For example, the allocation engine 105 may determine that a person has significant muscle mass, is generally physically fit, and meets all height and weight requirements for an exit row seat specified in the rules 107. The allocation engine 105 may then compute a score for the user reflecting a high degree of suitability for allocating the person to an exit row seat on an aircraft. At block 360, described in greater detail below with reference to FIG. 5, the allocation engine 105 determines non-physical attributes of each remaining passenger that was not filtered at block 340. As previously stated, the non-physical attributes include emotions, metal state, personality traits, preferences, and the like. For example, if the allocation engine 105 determines that a person engages in sky diving, parachuting, etc., the allocation engine 105 may determine that the user does not have a fear of heights, and computes a score reflecting a high degree of suitability for allocating the user to an exit row seat.

At block 370, the allocation engine 105 generates an ordered list of candidate passengers based on the determined attributes and/or the scores computed for each passenger. Generally, the allocation engine 105 orders the list based on one or more scores computed for each passenger. However, if the allocation engine 105 determines a passenger attribute violates a rule, the allocation engine 105 may place the passenger at the bottom of the list. At block 280, described in greater detail with reference to FIG. 7, the allocation engine 105 allocates passengers to seats based at least in part on the ordered list of passengers. The allocation engine 105 may store the results of the allocation in the allocation data 108, which may then be transmitted to the requesting entity, or may otherwise be made available to the requesting entity.

Figure 4:
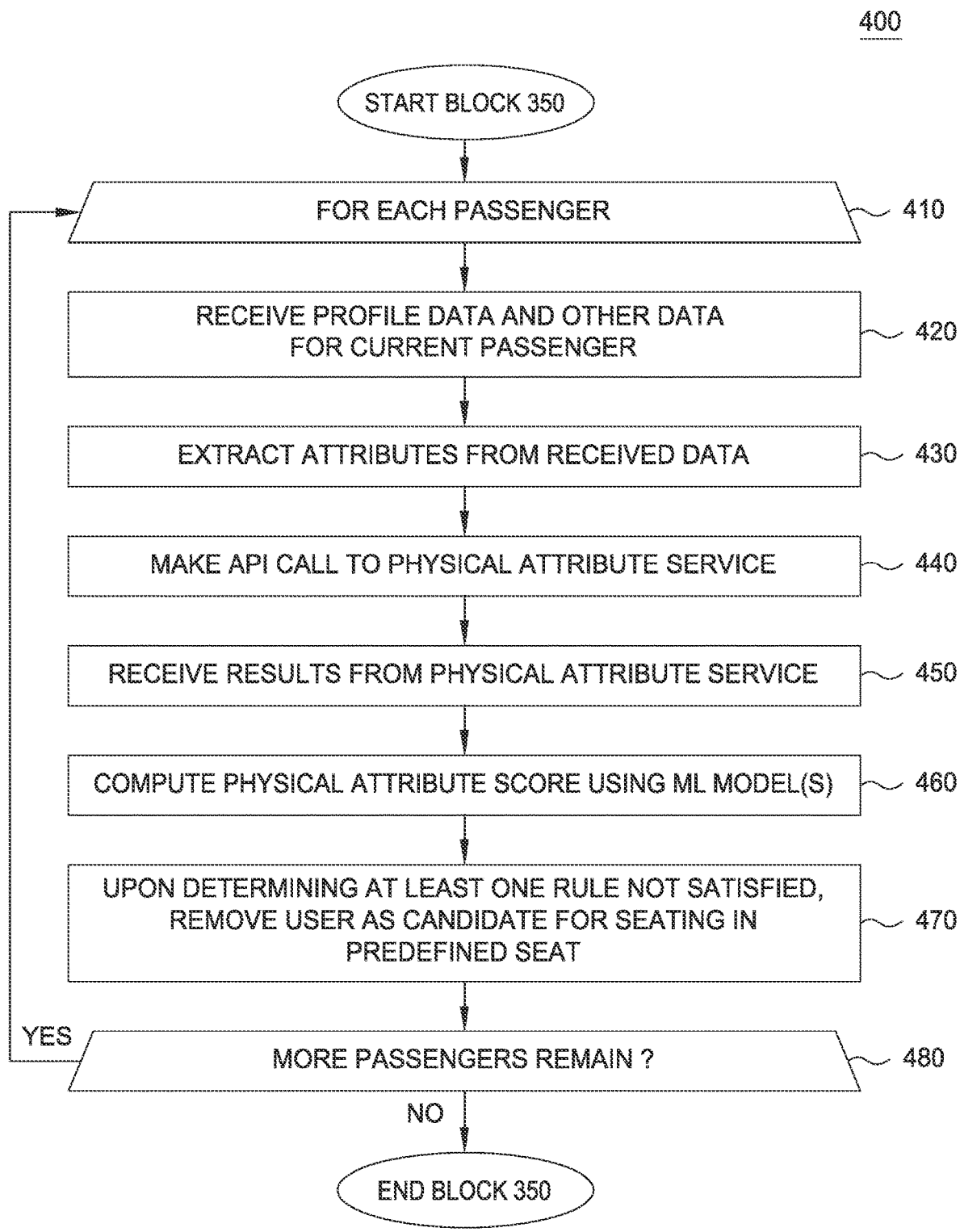
FIG. 4 is a flow chart illustrating an example method to determine physical attributes of passengers, according to one embodiment.

FIG. 4 is a flow chart illustrating an example method 400 corresponding to block 350 to determine physical attributes of passengers, according to one embodiment. As shown, the method 400 begins at block 410, where the allocation engine 105 executes a loop including blocks 420-480 for each passenger that was not filtered at block 340. At block 420, the allocation engine 105 receives data from the data sources 104 for the current passenger, such as profile data from the profiles 115, social media data 113, and publication data 114. At block 430, the allocation engine 105 optionally extracts attributes from the data received at block 420. For example, the allocation engine 105 may apply natural language processing to blog posts generated by the current passenger to extract sentiment, emotions, preferences, and other attributes therefrom. In such an example, the allocation 105 may determine that the blog posts indicate the passenger exercises multiple times per day, and is therefore likely physically fit. As another example, the allocation engine 105 may analyze images of the current passenger to determine the passenger is physically fit, images shared by the current passenger, and content "liked" by the passenger on social media platforms to extract attributes of the passenger therefrom.

At block 440, the allocation engine 105 makes an API call to the physical attribute service 112. The API call may include an indication of the current passenger, such as the passenger's full name, a user account name for social media services, email addresses extracted from the profile 115, and the like. At block 450, the allocation engine 105 receives a result set from the physical attribute service 112. The result set specifies one or more attributes determined based on analysis of images and/or other data describing the passenger. For example, the result set may specify physical height, weight, whether the passenger is physically fit, whether the passenger has significant muscle mass, and the like. At block 460, the allocation engine 105 computes a physical attribute score for the user based on the weights specified in the ML models 106. At block 470, the allocation engine 105 removes the current passenger as a candidate for seating in a seat upon determining that at least one of the determined physical attributes of the passenger do not satisfy at least one rule for the seat in the rules 107. For example, if the physical attribute score of the passenger does not exceed a minimum physical attribute score for a seat, the allocation engine 105 removes the current passenger from consideration for allocation for the seat. At block 480, the allocation engine 105 determines whether more passengers remain. If more passengers remain, the method returns to block 410. Otherwise, the method 400 ends.

Figure 5:
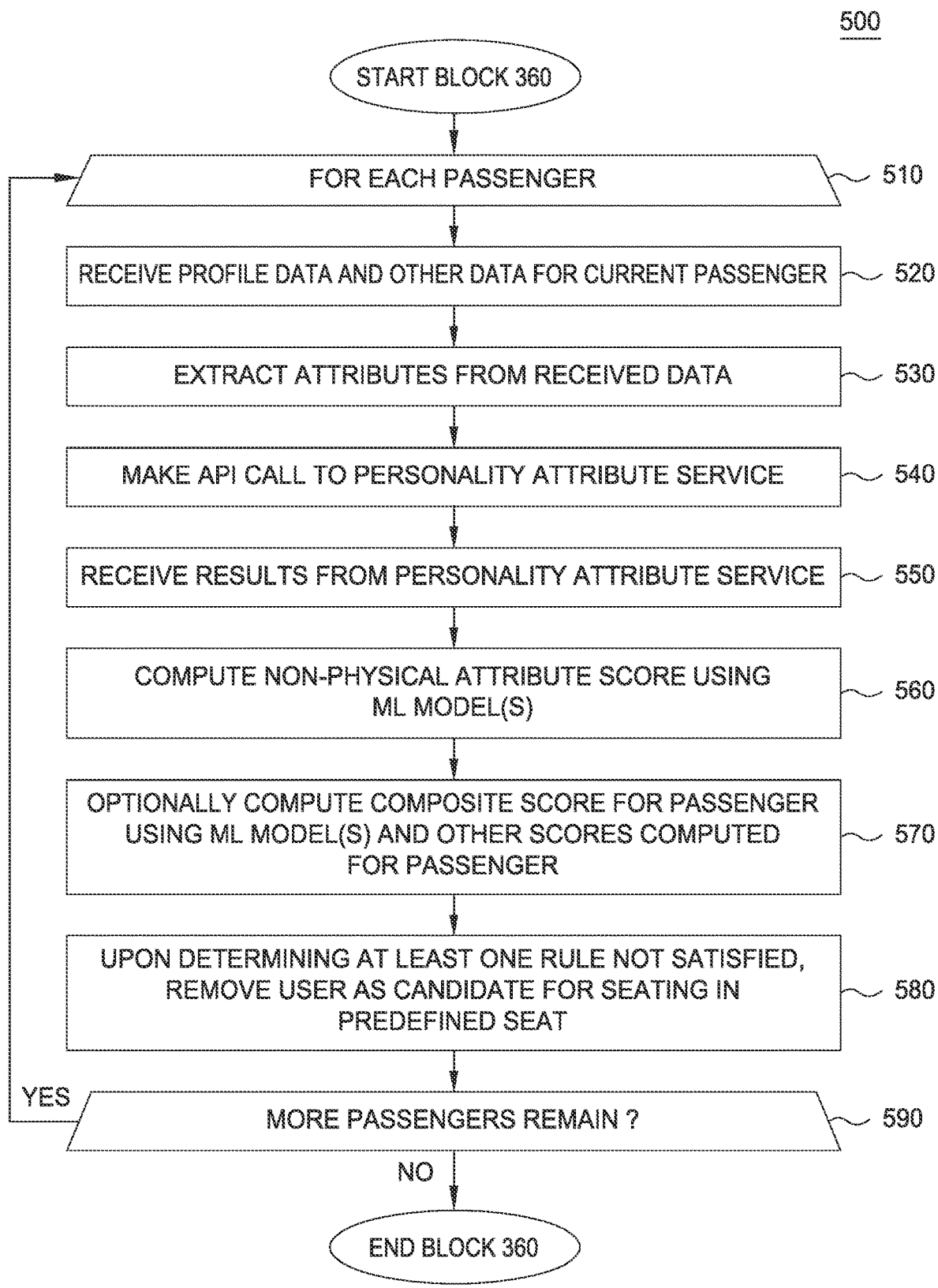
FIG. 5 is a flow chart illustrating an example method to determine non-physical attributes of passengers, according to one embodiment.

FIG. 5 is a flow chart illustrating an example method 500 corresponding to block 360 to determine non-physical attributes of passengers, according to one embodiment. As shown, the method 500 begins at block 510, where the allocation engine 105 executes a loop including blocks 520-580 for each passenger that was not filtered at block 340. At block 520, the allocation engine 105 receives data from the data sources 104 for the current passenger, such as profile data from the profiles 115, social media data 113, and publication data 114. At block 530, the allocation engine 105 optionally extracts attributes from the data received at block 520. For example, the allocation engine 105 may apply natural language processing to social media posts generated by the current passenger to extract sentiment, emotions, preferences, and other attributes therefrom. For example, if the allocation engine 105 detects a fearful or negative sentiment relative to heights in the social media posts, the allocation engine 105 may determine that the user has a fear of flying.

At block 540, the allocation engine 105 makes an API call to the non-physical attribute service 111. The API call may include an indication of the current passenger, such as the passenger's full name, a user account name for social media services, email addresses extracted from the profile 115, and the like. At block 550, the allocation engine 105 receives a result set from the non-physical attribute service 111. The result set specifies one or more non-physical attributes of the passenger, such as mental state, willingness to help others, personality traits, fears, likes, dislikes, emotions, and the like. At block 560, the allocation engine 105 computes a non-physical attribute score for the user based on the weights specified in the ML models 106. At block 570, the allocation engine 105 optionally computes a composite score based on the ML models 106 and the physical and non-physical attribute scores computed for the passenger at blocks 460 and 560, respectively. Doing so allows the allocation engine 105 to consider both the physical and non-physical attributes of the passenger when allocating the passenger to a seat. At block 580, the allocation engine 105 removes the current passenger as a candidate for seating in a seat upon determining that at least one of the determined physical attributes of the passenger do not satisfy at least one rule for the seat in the rules 107. For example, if the passenger expresses the emotions of fear, and a negative sentiment towards helping others, the allocation engine 105 may remove the passenger from consideration for allocation to a seat associated with the violated rule(s). As another example, if the non-physical attribute score does not exceed a minimum non-physical attribute score threshold, the allocation engine 105 may remove the passenger from consideration for allocation to a seat associated with the violated rule. Similarly, if the composite score does not exceed a minimum composite score threshold, the allocation engine 105 may remove the passenger from consideration for allocation to a seat associated with the violated rule. At block 590, the allocation engine 105 determines whether more passengers remain. If more passengers remain, the method returns to block 510. Otherwise, the method 500 ends.

Figure 6:
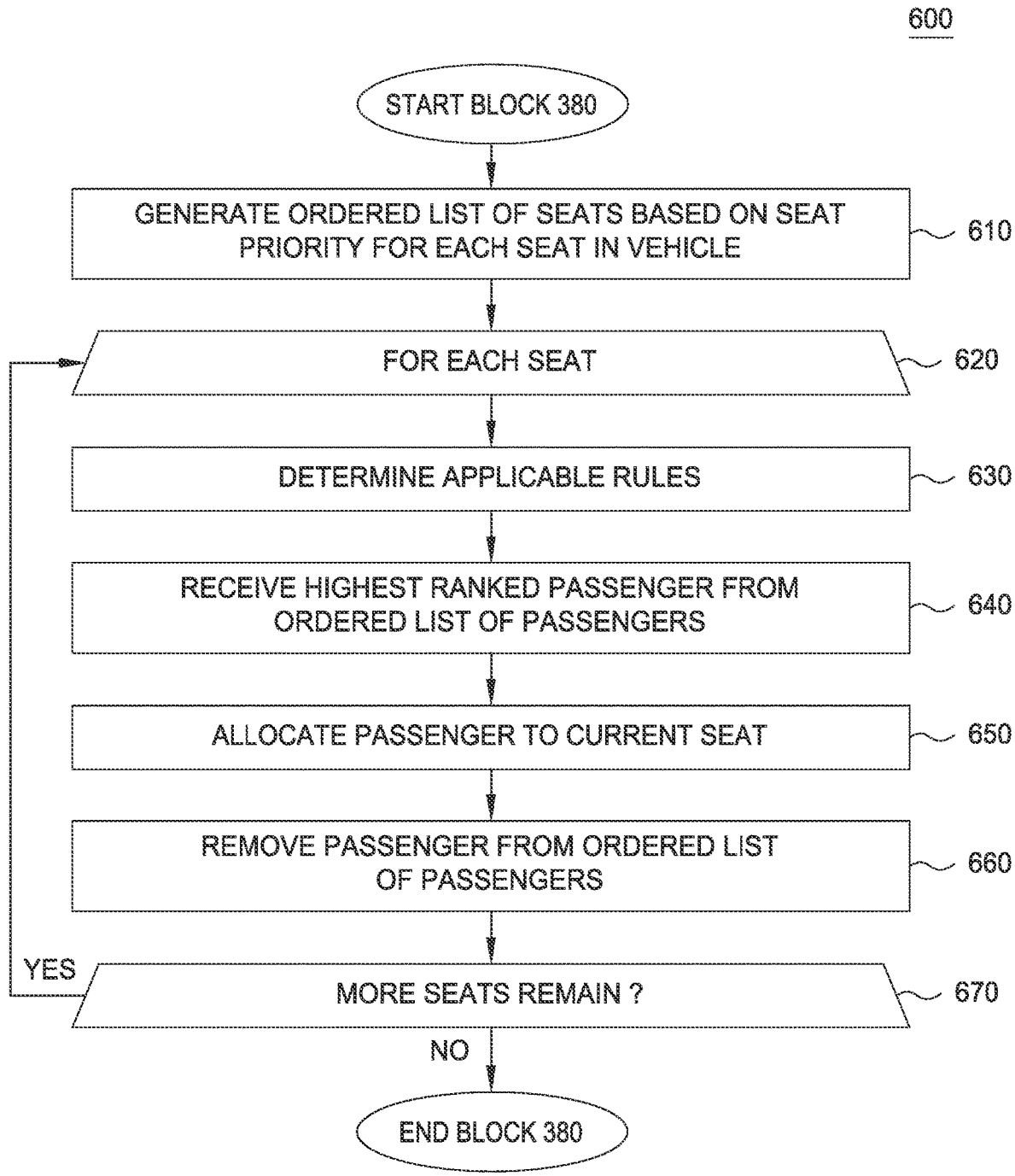
FIG. 6 is a flow chart illustrating an example method to allocate passengers to seats in a vehicle based on ordered list of candidate passengers, according to one embodiment.

FIG. 6 is a flow chart illustrating an example method 600 corresponding to block 380 to allocate passengers to seats in a vehicle based on ordered list of candidate passengers, according to one embodiment. As shown, the method 600 begins at block 610, where the allocation engine 105 generates an ordered list of seats based on the seat priority for each vehicle specified in the inventory data 110. In one embodiment, the ordered list of seats is received with the inventory data 110. At block 620, the allocation engine 105 executes a loop including blocks 630-670 for each seat in the ordered list. At block 630, the allocation engine 105 determines the rules from the rules 107 that are applicable to the current seat. For example, the current seat may be associated with rules that require the passenger to not be afraid of heights, express a positive sentiment towards helping others, required physical attributes, and the like.

At block 640, the allocation engine 105 receives the highest ranked passenger from the ordered list of passengers generated at block 370. At block 650, the allocation engine 105 allocates the highest ranked passenger to the current seat, e.g., by storing an indication of the allocation in the allocation data 108. At block 660, the allocation engine 105 removes the passenger allocated to the seat from the ordered list of passengers. At block 670, the allocation engine 105 determines whether more seats remain. If more seats remain, the allocation engine 105 returns to block 670. Otherwise, the method 600 ends.

Figure 7:
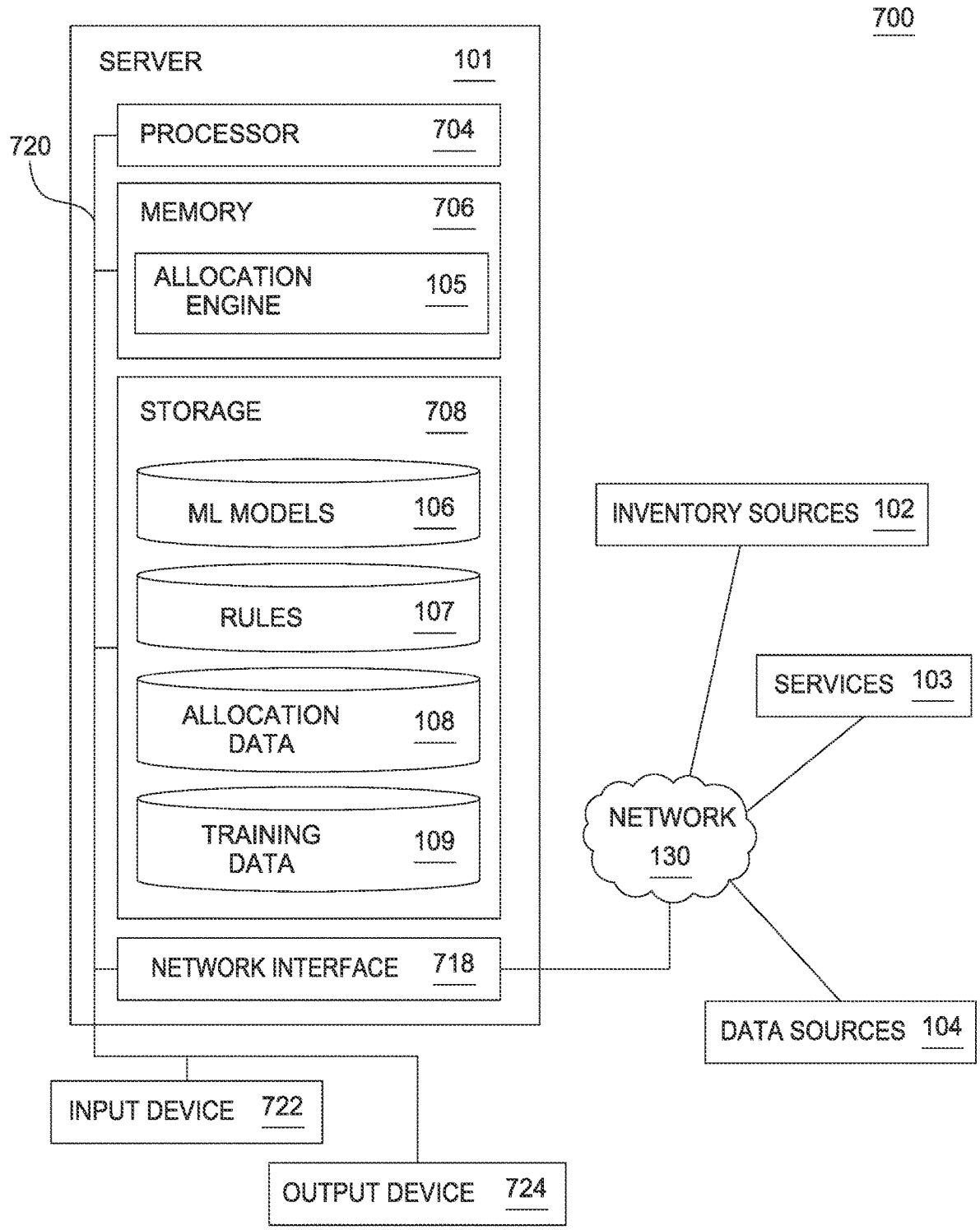
FIG. 7 illustrates an example system which provides cognitive-based passenger selection for vehicles, according to one embodiment.

FIG. 7 illustrates an example system 700 which provides cognitive-based passenger selection for vehicles, according to one embodiment. The networked system 700 includes a server 101. The server 101 may also be connected to other computers (e.g., the inventory sources 102, the services 103, and the data sources 104) via the network 130. In general, the network 130 may be a telecommunications network and/or a wide area network (WAN). In a particular embodiment, the network 130 is the Internet.

The server 101 generally includes a processor 704 which obtains instructions and data via a bus 720 from a memory 706 and/or a storage 708. The server 101 may also include one or more network interface devices 718, input devices 722, and output devices 724 connected to the bus 720. The server 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the server 101 to communicate with other computers via the network 130.

The storage 708 is representative of hard-disk drives, solid state drives, flash memory devices, optical media and the like. Generally, the storage 708 stores application programs and data for use by the server 101. In addition, the memory 706 and the storage 708 may be considered to include memory physically located elsewhere; for example, on another computer coupled to the server 101 via the bus 720.

The input device 722 may be any device for providing input to the server 101. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the server 101. The output device 724 may include output devices such as monitors, touch screen displays, and so on.

As shown, the memory 706 contains the allocation engine 105, while the storage 708 contains the ML models 106, rules 107, allocation data 108, and training data 109, each described in greater detail above. Generally, the system 700 implements all systems, methods, and functionality described above with reference to FIGS. 1-6.

Advantageously, embodiments disclosed herein provide techniques to intelligently allocate passengers to seats in mass-transit vehicles. By identifying those persons most willing and able to sit in a particular seat, the safety of all passengers is improved. Furthermore, performance of the server 101 is improved, as the allocation engine 105 is able to generate more accurate allocations that need not be revised. Doing so saves computing resources of the server 101.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the allocation engine 105 could execute on a computing system in the cloud. In such a case, the allocation engine 105 may store the seat allocations in the allocation data 108 for a plurality of clients at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer program product, comprising:
a non-transitory computer-readable storage medium having computer readable program code embodied therewith, the computer readable program code executable by a processor to perform an operation comprising:
receiving, by an application executing on a processor, a plurality of rules associated with a first seat of a plurality of seats in a mass-transit vehicle;
determining a plurality of physical attributes for a first passenger, of a plurality of passengers, based on data describing the first passenger received from a plurality of data sources;
determining a plurality of non-physical attributes for the first passenger based on the data describing the first passenger;
determining that at least one of the plurality of physical attributes and the plurality of non-physical attributes of the first passenger satisfy each rule in the plurality of rules associated with the first seat;
computing, at a first time, a first score reflecting a degree of suitability for the first passenger, with respect to the first seat, by processing the plurality of physical attributes and the plurality of non-physical attributes with a trained machine learning (ML) model;
determining that the first score exceeds a threshold score associated with the first seat;
allocating, by the application, the first passenger to the first seat in the mass-transit vehicle; and
computing, at a second time, a second score for the first passenger by processing at least one new attribute of the first passenger using the trained ML model; and
reallocating the first seat to a second passenger based on the second score.

2. The computer program product of claim 1, wherein the mass-transit vehicle comprises one of: (i) an airplane, (ii) a bus, and (iii) a train, wherein a first physical attribute of the plurality of physical attributes is received from a physical attribute service via a network, wherein the physical attribute service determines the first physical attribute based on an analysis of an image of the first passenger received from at least one of the plurality of data sources.

3. The computer program product of claim 1, wherein the non-physical attributes comprise: (i) emotions expressed by the first passenger, (ii) sentiment expressed by the first passenger, (iii) a preference of the first passenger, and (iv) a personality trait of the first passenger, wherein a first non-physical attribute of the plurality of non-physical attributes is received from a non-physical attribute service via a network, wherein the non-physical attribute service determines the first non-physical attribute based on an analysis of: (i) blog posts generated by the first passenger, (ii) social media publications generated by the first passenger, and (iii) a profile of the first passenger received from the plurality of data sources.

4. The computer program product of claim 1, the operation further comprising:
training the application to generate the ML model based on training data, wherein the ML model specifies weights for the plurality of physical attributes and the plurality of non-physical attributes, wherein the application computes the first score based on the weights specified in the ML model.

5. The computer program product of claim 4, wherein the first score comprises a composite score, wherein the composite score is computed based on: (i) a physical attribute score computed based on the weights specified in the ML model and the plurality of physical attributes of the first passenger, (ii) a non-physical attribute score computed based on the weights specified in the ML model and the plurality of non-physical attributes of the first passenger.

6. The computer program product of claim 1, the operation further comprising:
computing a respective score for each respective passenger of the plurality of passengers based on the ML model and a respective plurality of physical and non-physical attributes of each respective passenger;
generating an ordered list of the plurality of passengers ranked based on the respective score for each respective passenger of the plurality of passengers; and
allocating each respective passenger of the plurality of passengers to a respective seat in the mass-transit vehicle based on the ordered list of the plurality of passengers.

7. The computer program product of claim 1, the operation further comprising:
determining a second plurality of physical attributes for a third passenger, of the plurality of passengers, based on data describing the third passenger received from the plurality of data sources;
determining a second plurality of non-physical attributes for the third passenger based on the data describing the first passenger;
determining that at least one of the second plurality of physical attributes and the second plurality of non-physical attributes of the third passenger violates at least one rule associated with a second seat in the mass-transit vehicle;
denoting, in a record stored in a memory, that the second seat in the mass-transit vehicle is unavailable to the third passenger based on the violation of the at least one rule associated with the second seat; and
allocating the third passenger to a third seat in the mass-transit vehicle.

8. A system, comprising:
a processor; and
a memory storing one or more instructions which, when executed by the processor, performs an operation comprising:
receiving, by an application executing on a processor, a plurality of rules associated with a first seat of a plurality of seats in a mass-transit vehicle;
determining a plurality of physical attributes for a first passenger, of a plurality of passengers, based on data describing the first passenger received from a plurality of data sources;
determining a plurality of non-physical attributes for the first passenger based on the data describing the first passenger;
determining that at least one of the plurality of physical attributes and the plurality of non-physical attributes of the first passenger satisfy each rule in the plurality of rules associated with the first seat;
computing, at a first time, a first score reflecting a degree of suitability for the first passenger, with respect to the first seat, by processing the plurality of physical attributes and the plurality of non-physical attributes with a trained machine learning (ML) model;

determining that the first score exceeds a threshold score associated with the first seat;

allocating, by the application, the first passenger to the first seat in the mass-transit vehicle; and computing, at a second time, a second score for the first passenger by processing at least one new attribute of the first passenger using the trained ML model; and reallocating the first seat to a second passenger based on the second score.

9. The system of claim 8, wherein the mass-transit vehicle comprises one of: (i) an airplane, (ii) a bus, and (iii) a train, wherein a first physical attribute of the plurality of physical attributes is received from a physical attribute service via a network, wherein the physical attribute service determines the first physical attribute based on an analysis of an image of the first passenger received from at least one of the plurality of data sources.

10. The system of claim 8, wherein the non-physical attributes comprise: (i) emotions expressed by the first passenger, (ii) sentiment expressed by the first passenger, (iii) a preference of the first passenger, and (iv) a personality trait of the first passenger, wherein a first non-physical attribute of the plurality of non-physical attributes is received from a non-physical attribute service via a network, wherein the non-physical attribute service determines the first non-physical attribute based on an analysis of: (i) blog posts generated by the first passenger, (ii) social media publications generated by the first passenger, and (iii) a profile of the first passenger received from the plurality of data sources.

11. The system of claim 8, the operation further comprising:

training the application to generate the ML model based on training data, wherein the ML model specifies weights for the plurality of physical attributes and the plurality of non-physical attributes, wherein the application computes the first score based on the weights specified in the ML model.

12. The system of claim 11, wherein the first score comprises a composite score, wherein the composite score is computed based on: (i) a physical attribute score computed based on the weights specified in the ML model and the plurality of physical attributes of the first passenger, (ii) a non-physical attribute score computed based on the weights specified in the ML model and the plurality of non-physical attributes of the first passenger.

13. The system of claim 8, the operation further comprising:

computing a respective score for each respective passenger of the plurality of passengers based on the ML model and a respective plurality of physical and non-physical attributes of each respective passenger;

generating an ordered list of the plurality of passengers ranked based on the respective score for each respective passenger of the plurality of passengers; and allocating each respective passenger of the plurality of passengers to a respective seat in the mass-transit vehicle based on the ordered list of the plurality of passengers.

14. The system of claim 8, the operation further comprising:

determining a second plurality of physical attributes for a third passenger, of the plurality of passengers, based on data describing the third passenger received from the plurality of data sources;

determining a second plurality of non-physical attributes for the third passenger based on the data describing the first passenger;

determining that at least one of the second plurality of physical attributes and the second plurality of non-physical attributes of the third passenger violates at least one rule associated with a second seat in the mass-transit vehicle;

denoting, in a record stored in a memory, that the second seat in the mass-transit vehicle is unavailable to the third passenger based on the violation of the at least one rule associated with the second seat; and allocating the third passenger to a third seat in the mass-transit vehicle.

* * * * *